United States Patent
Jung (10) Patent No.: US 12,384,451 B2
(45) Date of Patent: Aug. 12, 2025

(54) PROTECTION DEVICE OF ELECTRIC POWER STEERING SYSTEM AND ELECTRIC POWER STEERING SYSTEM INCLUDING THE SAME

(71) Applicant: HL MANDO CORPORATION, Pyeongtaek-si (KR)

(72) Inventor: Tony Jung, Suwon-si (KR)

(73) Assignee: HL MANDO CORPORATION, Pyeongtaek-si (KR)

( * ) Notice: Subject to any disclaimer, the term of this patent is extended or adjusted under 35 U.S.C. 154(b) by 69 days.

(21) Appl. No.: 18/379,454

(22) Filed: Oct. 12, 2023

(65) Prior Publication Data
US 2024/0300571 A1 Sep. 12, 2024

(30) Foreign Application Priority Data
Mar. 10, 2023 (KR) .......... 10-2023-0031689

(51) Int. Cl.
*B62D 5/04* (2006.01)
*H02P 29/02* (2016.01)

(52) U.S. Cl.
CPC .......... *B62D 5/0481* (2013.01); *B62D 5/046* (2013.01); *H02P 29/02* (2013.01)

(58) Field of Classification Search
None
See application file for complete search history.

(56) References Cited

U.S. PATENT DOCUMENTS

| | | | | |
|---|---|---|---|---|
| 4,336,484 A | * | 6/1982 | Marinko | H02P 8/22 318/432 |
| 4,549,627 A | * | 10/1985 | Takeshima | B62D 5/065 180/422 |
| 6,987,378 B1 | * | 1/2006 | Steele | H02M 3/1588 323/224 |
| 7,269,764 B2 | * | 9/2007 | Dart | G11C 29/021 340/661 |
| 7,339,359 B2 | * | 3/2008 | Choi | H02M 3/33523 323/284 |
| 7,734,955 B2 | * | 6/2010 | Dart | G11C 5/147 361/111 |
| 7,782,097 B2 | * | 8/2010 | Lee | G09G 3/3688 327/143 |

(Continued)

FOREIGN PATENT DOCUMENTS

| | | | | | |
|---|---|---|---|---|---|
| CN | 117394282 A | * | 1/2024 | ....... | G01R 19/16557 |
| CN | 117410940 A | * | 1/2024 | ....... | H02H 7/20 |

*Primary Examiner* — Kevin R Steckbauer
(74) *Attorney, Agent, or Firm* — Hauptman Ham, LLP (57) ABSTRACT

A protection device for an electric power steering (EPS) system may include a first comparator for comparing a high voltage potential of a power supply of an electric power steering system with a threshold high voltage, a second comparator for comparing the high voltage potential of the power supply with a threshold low voltage, an exclusive switching unit for outputting an enable signal or a disable signal according to whether a first comparison output signal of the first comparator and a second comparison output signal of the second comparator are the same, and a battery cutoff device for switching a voltage supply of the power supply to an electronic control unit of the electric power steering system according to the enable signal or the disable signal.

20 Claims, 9 Drawing Sheets

(56) References Cited

U.S. PATENT DOCUMENTS

| | | | | |
|---|---|---|---|---|
| 7,848,066 B2* | 12/2010 | Yanagishima | | H02P 29/032 |
| | | | | 318/434 |
| 9,203,661 B2* | 12/2015 | Kashima | | H04L 25/4902 |
| 10,281,966 B2* | 5/2019 | Lu | | H02J 9/061 |
| 11,211,955 B2* | 12/2021 | Choi | | H03F 3/72 |
| 11,705,751 B1* | 7/2023 | Wei | | H02J 3/32 |
| | | | | 307/26 |
| 11,705,851 B2* | 7/2023 | Song | | G01R 19/16571 |
| | | | | 318/400.21 |
| 11,843,398 B2* | 12/2023 | Choi | | H03F 3/195 |
| 12,009,822 B2* | 6/2024 | Kawahara | | H03K 3/012 |
| 12,027,961 B2* | 7/2024 | Nam | | G06F 1/3206 |
| 12,218,580 B2* | 2/2025 | Sengodan | | H02M 1/32 |
| 12,228,594 B2* | 2/2025 | Ashokkumar | | G01R 19/16566 |
| 2003/0076079 A1* | 4/2003 | Alcantar | | H02M 1/32 |
| | | | | 323/285 |
| 2005/0141158 A1* | 6/2005 | Sae-Ueng | | H02M 1/32 |
| | | | | 361/91.1 |
| 2006/0209007 A1* | 9/2006 | Pyo | | B60R 1/088 |
| | | | | 345/105 |
| 2007/0019350 A1* | 1/2007 | Blackwell | | H03K 19/00315 |
| | | | | 361/93.1 |
| 2007/0146017 A1* | 6/2007 | Sadayuki | | G05F 1/575 |
| | | | | 327/77 |
| 2007/0162787 A1* | 7/2007 | Dart | | G11C 5/147 |
| | | | | 714/54 |
| 2009/0031168 A1* | 1/2009 | Dart | | G11C 29/02 |
| | | | | 714/E11.159 |
| 2010/0073836 A1* | 3/2010 | Arnold | | G05F 1/569 |
| | | | | 361/86 |
| 2010/0117577 A1* | 5/2010 | Yanagishima | | H02P 29/032 |
| | | | | 318/432 |
| 2011/0069420 A1* | 3/2011 | Chiu | | H02M 1/36 |
| | | | | 361/88 |
| 2012/0169116 A1* | 7/2012 | Graf | | B60R 16/03 |
| | | | | 307/10.7 |
| 2013/0162232 A1* | 6/2013 | Itoh | | G05F 1/595 |
| | | | | 323/271 |
| 2015/0055696 A1* | 2/2015 | Kashima | | H04B 3/542 |
| | | | | 375/238 |
| 2015/0274099 A1* | 10/2015 | Boucly | | H02M 3/156 |
| | | | | 307/10.1 |
| 2016/0241145 A1* | 8/2016 | Matsuura | | H02M 1/14 |
| 2018/0224873 A1* | 8/2018 | Motz | | G05F 3/30 |
| 2019/0079569 A1* | 3/2019 | Lu | | G06F 1/30 |
| 2020/0313703 A1* | 10/2020 | Choi | | H03F 1/52 |
| 2021/0265833 A1* | 8/2021 | Flor | | H02H 7/18 |
| 2022/0006416 A1* | 1/2022 | Song | | G01R 19/16571 |
| 2022/0116060 A1* | 4/2022 | Choi | | H03F 1/52 |
| 2022/0302840 A1* | 9/2022 | Assaad | | H02M 3/158 |
| 2023/0040473 A1* | 2/2023 | Gu | | H02J 50/12 |
| 2023/0070322 A1* | 3/2023 | Kawahara | | H03K 17/14 |
| 2023/0094277 A1* | 3/2023 | Huang | | G06F 21/81 |
| | | | | 380/28 |
| 2023/0155474 A1* | 5/2023 | Nam | | G06F 1/3212 |
| | | | | 345/211 |
| 2023/0176095 A1* | 6/2023 | Ashokkumar | | H03K 19/0021 |
| | | | | 324/114 |
| 2023/0367025 A1* | 11/2023 | Riehl | | H04N 25/773 |
| 2024/0300571 A1* | 9/2024 | Jung | | H02P 29/02 |
| 2024/0322665 A1* | 9/2024 | Nam | | G06F 1/3206 |
| 2025/0007391 A1* | 1/2025 | Sengodan | | H02M 3/158 |

* cited by examiner

PROTECTION DEVICE OF ELECTRIC POWER STEERING SYSTEM AND ELECTRIC POWER STEERING SYSTEM INCLUDING THE SAME

CROSS REFERENCE TO RELATED APPLICATION

This application claims the benefit of priority to Korean Patent Application No. 10-2023-0031689, filed on Mar. 10, 2023 in the Korean Intellectual Property Office, the entire content of which is incorporated herein by reference.

TECHNICAL FIELD

An embodiment of the present disclosure relates to a protection device of an electric power steering (EPS) system and an electric power steering system including the same. In particular, the present disclosure relates to a device for protecting an EPS system from an abnormal high voltage signal applied to the EPS system and the EPS system including the same.

BACKGROUND

A steering device or a steering system is used as a device for controlling the travelling direction of a vehicle. Recently, there is widely utilized an electric power steering (hereinafter referred to as 'EPS') system in which a steering motor provides necessary steering force by electronic control.

The EPS system operates to rotate a steering shaft of a steering column or move a rack bar connected thereto by driving a steering motor according to a steering torque applied to a steering wheel by a driver.

To this end, a steering device may include a steering motor, an electronic control unit (ECU) for controlling the steering motor, and a speed reducer connected to the steering motor. The speed reducer connected to the steering motor operates in conjunction with the steering shaft of the steering column or the rack bar.

In addition, the EPS system may further include a power supply and a control circuit for supplying driving current to the steering motor for driving/controlling the steering motor.

The control circuit may include an inverter composed of a plurality of switching elements and an electronic control unit (ECU) for controlling the inverter.

Since an ECU is implemented in the form of a chip and has an important function of controlling the steering motor, there is required to properly protect the ECU from an unstable external environment.

Particularly, high voltage power sources are increasingly used in recent vehicles due to increased performance of electric systems.

In addition to a general 12V power supply, there is increasing the use of the high voltage power sources such as 24V and 48V.

Due to the use of such a high voltage power source, an ultra-high voltage may be temporarily applied to the ECU, and in this case, damage to the ECU may occur.

Accordingly, there may be used a protection circuit including a transient voltage suppressors (TVS) diode for protecting the ECU against a high voltage in a pulse form in a control circuit such as the general ECU.

Specifically, the protection circuit including the TVS diode may protect the ECU by converting the overvoltage applied to the ECU into heat and dissipating the heat.

However, the protection circuit using the TVS diode has a disadvantage of occupying a lot of space due to the large size.

In addition, the protection circuit using the TVS diode may cause a problem in that the protection function may not be provided since the TVS diode is damaged in the case that the applied high voltage is not in the form of a pulse.

Therefore, there is a need to provide a simple and reliable protection device in order to protect the steering system using the high voltage of a vehicle.

SUMMARY

According to embodiments of the present disclosure, a protection device may be provided for protecting an EPS system of a vehicle from high voltage and an EPS system including the same.

According to embodiments of the present disclosure, a protection device may be provided for allowing a battery cutoff device to supply voltage in a normal voltage range and not supply voltage in an abnormal voltage range, and an EPS system including the same may be provided.

According to embodiments of the present disclosure, a protection device may be capable of protecting an EPS system even if the high voltage applied to an EPS system is not in the form of a pulse, and an EPS system including the same may be provided.

According to embodiments of the present disclosure, a protection device may be capable of preventing malfunction of the EPS system due to low voltage by preventing the battery cutoff device from supplying voltage even at abnormally low voltage in addition to abnormally high voltage, and an EPS system including the same may be provided.

In accordance with an aspect of the present disclosure, there is provided an electric power steering system including a power supply, an electronic control unit configured to control driving of a steering motor based on a supply voltage applied from the power supply, a steering motor which is driven by the electronic control unit to electrically assist or operate a steering of a vehicle, and a protection device including a protection circuit configured to prevent an abnormal voltage from being applied to the electronic control unit, in which the protection circuit includes a first comparator for comparing a high voltage potential of the power supply with a threshold high voltage, a second comparator for comparing the high voltage potential of the power supply with a threshold low voltage, an exclusive switching unit configured to output an enable signal or a disable signal according to whether a first comparison output signal of the first comparator and a second comparison output signal of the second comparator are the same, and a battery cutoff device configured to switch a voltage supply of the power supply to the electronic control unit according to the enable signal or the disable signal.

The exclusive switching unit may be an XOR gate element.

In this case, the XOR gate element my output the disable signal in response to determining that the first comparison output signal and the second comparison output signal are the same, and output the enable signal in response to determining that the first comparison output signal and the second comparison output signal are different.

The battery cutoff device may be a field effect transistor (FET) including a gate receiving the enable signal, a source receiving a voltage of the power supply, and a drain outputting an output voltage supplied to the electronic control unit.

The protection circuit may further include a first resistance element disposed between a first-1 input terminal of the first comparator for inputting the high voltage potential and a first-2 input terminal to which the threshold high voltage is input, and a first diode element disposed between the first-2 input terminal and a ground.

The protection circuit may further include a second resistance element disposed between a second-1 input terminal of the second comparator for receiving the high voltage potential and a second-2 input terminal to which the threshold low voltage is input, and a second diode element disposed between the second-2 input terminal and the ground.

A value of the threshold high voltage may be determined by the first resistance element, and a value of the threshold low voltage may be determined by the second resistance element.

If the supply voltage of the power supply is equal to or higher than the threshold high voltage, the battery cutoff device may be turned off and power supply to the electronic control unit may be cut off.

Alternatively, in response to determining that the supply voltage of the power supply is less than or equal to the threshold low voltage, the battery cutoff device may be turned off and power supply to the electronic control unit may be cut off.

In accordance with another aspect of the present disclosure, there is provided a protection device for an electric power steering system including a first comparator configured to compare a high voltage potential of a power supply of an electric power steering system with a threshold high voltage, a second comparator configured to compare the high voltage potential of the power supply with a threshold low voltage, an exclusive switching unit configured to output an enable signal or a disable signal according to whether a first comparison output signal of the first comparator and a second comparison output signal of the second comparator are the same, and a battery cutoff device configured to switch a voltage supply of the power supply to an electronic control unit of the electric power steering system according to the enable signal or the disable signal According to an embodiment of the present disclosure, it is possible to provide a simple and reliable protection device for protecting the EPS system of a vehicle from high voltage and an EPS system including the same.

In addition, it is possible to provide a protection device capable of protecting the EPS system even in response to determining that the high voltage applied to the EPS system is not in the form of a pulse, and an EPS system including the same.

In addition, it is possible to prevent a malfunction of the EPS system due to low voltage by preventing the battery cutoff device from supplying voltage even at abnormally low voltage in addition to abnormally high voltage.

DETAILED DESCRIPTION

In the following description of examples or embodiments of the present disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present disclosure, detailed descriptions of well-known functions and components incorporated herein will be omitted when it is determined that the description may make the subject matter in some embodiments of the present disclosure rather unclear. The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

Hereinafter, the present embodiment will be described in detail with reference to the drawings.

Figure 1:
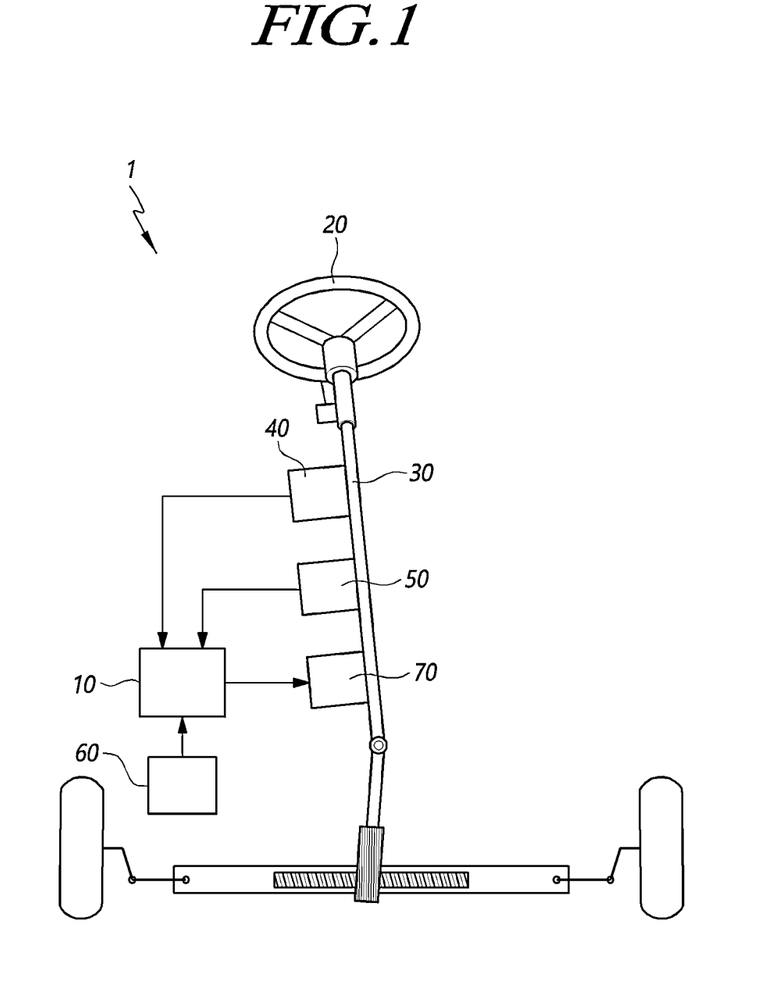
FIG. 1 illustrates a schematic configuration of a EPS system according to an embodiment of the present disclosure.

FIG. 1 illustrates a schematic configuration of an EPS system according to an embodiment of the present disclosure.

Referring to FIG. 1, the EPS system 1 according to an embodiment may refer to a system which controls a steering of a vehicle equipped with the EPS system 1 to change according to the rotational angle of a steering wheel 20 operated by a driver.

Depending on a driving method, the EPS system 1 may be implemented by a hydraulic power steering (HPS) which generates hydraulic pressure by turning a pump to provide steering assist power, or an electronic power steering (EPS) which provides steering assist power by driving a motor.

Meanwhile, depending on whether a steering input actuator and a steering output actuator are coupled with a mechanical connecting member (or linkage), the EPS system 1 may be a mechanical EPS system in which a force (torque) generated by a rotation of a steering wheel 20 by a driver is transmitted to the steering motor 70 through a mechanical power transmission device (e.g., linkage, etc.), a steering motor 70 is driven to steer the wheels of a vehicle, or a steer-by-wire (SbW) system that transmits power by transmitting and receiving electrical signals through wires, cables, etc. instead of mechanical power transmission devices.

In addition, the EPS system 1 may include a C-MDPS system, which is a column-type (C-type) motor-driven power steering (MDPS) device in which a steering motor rotates a steering shaft of a steering column, a R-MDPS system, which is a rack-type (R-Type) MDPS device in which a steering motor directly rotates a rack bar, or the above-described steer-by-wire steering system.

In the following description, it will be described a C-MDPS steering system as an example, but an embodiment of the present disclosure is not limited thereto, and may be applied to all types of EPS systems.

Referring to FIG. 1, the EPS system 1 according to the present disclosure may include a steering control unit 10, a steering wheel 20, a steering column 30, a steering angle sensor 40, a torque sensor 50, a speed sensor 60, and a steering motor 70.

The steering wheel 20 may be rotated by a driver's manipulation. The steering wheel 20 may be coupled to an input shaft of the steering shaft, and may be connected to a rack bar through a pinion gear connected to an output shaft of the steering shaft and a rack gear. The shape of the steering wheel 20 may be circular as shown in FIG. 1, but is not limited thereto.

The steering shaft of the steering column 30 may include the input shaft coupled to the steering wheel 20 and the output shaft rotating together with the input shaft, and may be rotated together with the steering wheel 20. The shape of the steering shaft of the steering column 30 may be cylindrical.

Although not shown, the steering shaft of the steering column 30 may be linked to a plurality of reducers, and any one of the plurality of reducers may be coupled to the steering column 30.

The steering angle sensor 40 may detect a steering angle generated by rotation of the steering wheel 20. In addition, the steering angle sensor 40 may output a steering angle signal indicating information on the steering angle.

Here, the steering angle may not be generally detected if the steering wheel 20 does not rotate, and thus the steering angle signal may not be output unless the steering wheel 20 rotates.

The torque sensor 50 may detect steering torque generated by rotation of the steering wheel 20. In addition, if the steering torque is detected, the torque sensor 50 may output a steering torque signal indicating information on the steering torque.

Here, the steering torque may mean a torque applied to a torsion bar disposed between an input shaft and an output shaft of the steering shaft. Therefore, steering torque may be detected even if the steering wheel 20 is not rotated.

The speed sensor 60 may detect a speed of the vehicle and output a vehicle speed signal indicating information on the vehicle speed.

The steering control unit 10 may receive steering information, calculate a target rack position for providing steering assist and output a force, target current corresponding to the rack position to the steering motor 70. Here, the steering information may include a steering angle signal output by the steering angle sensor 40, a steering torque signal output by the torque sensor 50, and a vehicle speed signal output by the speed sensor 60.

The steering control unit 10 may be implemented as a hardware and software such as an electronic control unit (ECU) including a micro controller unit (MCU), an inverter, a printed circuit board (PCB), and the like.

The steering motor 70 may receive a target current from the steering control unit 10 and drive according to the torque and rotational speed corresponding to the target current. Although not shown, the steering motor 70 may transfer rotational force to the steering shaft through a reducer disposed on the steering column 30.

In order to easily change the driving direction of the vehicle with a smaller force by assisting the operating force of the steering wheel 20, the EPS system 1 may calculate a target rack position for providing steering assist force based on steering information of the steering angle sensor 40, the torque sensor 50, and the speed sensor 60 in the steering control unit 10, and may output a target current corresponding to the rack position to the steering motor 70.

Here, in the EPS system 1, as the steering shaft of the steering column is rotated by the rotation of the steering motor 70, the rack bar may move left and right through the pinion gear connected to the output end of the steering shaft and the rack gear formed on the rack bar.

Accordingly, the EPS system 1 may steer the vehicle in a desired direction by moving the wheels connected to both ends of the rack bar to the left or right with the rotation of the steering motor 70 assisting the operating force of the steering wheel 20.

The steering motor included in the EPS system 1 may be a three-phase motor, but is not limited thereto.

The steering control unit 10 may perform a function of receiving power from a power supply (not shown), generating a target current to be supplied to each winding of the steering motor using an inverter, and supplying the target current to the steering motor.

Figure 2:
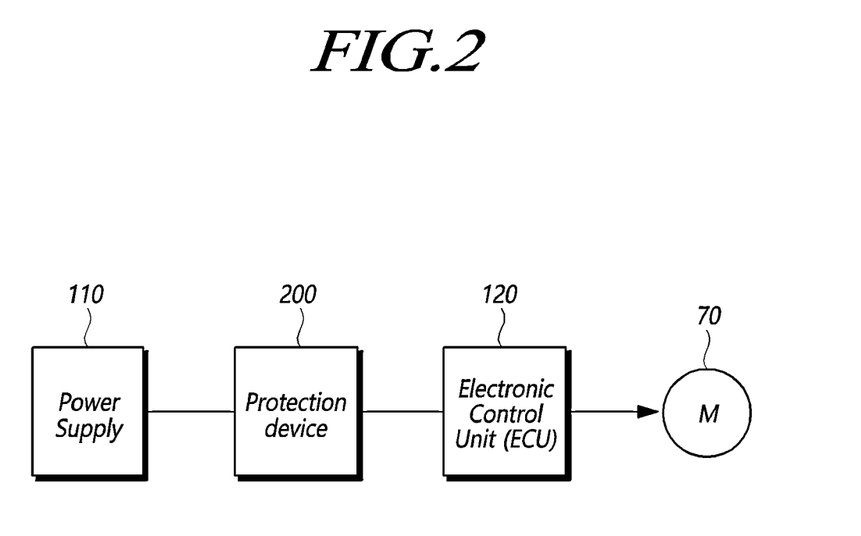
FIG. 2 illustrates a configuration of a power supply and a control unit in the EPS system according to an embodiment of the present disclosure.

FIG. 2 illustrates a configuration of a power supply and a control unit in the EPS system according to an embodiment of the present disclosure.

Referring to FIG. 2, the EPS system 1 according to the present embodiment may include a power supply 110, an electronic control unit (ECU) 120 for supplying a target current to a steering motor 70, and a protection device 200 disposed between the power supply 110 and the ECU 120 to prevent damage to the ECU 120.

The power supply 110 is a device for supplying a specific driving voltage to the ECU 120, and the driving voltage may be a DC voltage.

The power supply 110 may be a battery, and the DC driving voltage may be 12V, 24V, or 48V, but is not limited thereto.

The ECU 120 may receive power from the power supply 110, generate a target current to be supplied to each winding of the steering motor 70 using an inverter, and supply the target current to the steering motor 70.

A detailed configuration of the ECU 120 will be described in more detail below based on FIG. 6.

In addition, a power control unit for controlling power supplying from the power supply 110 to the ECU 120 may be further included.

The protection device 200 may be disposed between the power supply 110 and the ECU 120 or inside the ECU 120 to prevent damage to the ECU 120 due to an abnormal high voltage.

Since the ECU 120 performs an important function of controlling the steering motor 70, it is required to be properly protected from an unstable external environment.

In particular, high voltage power sources (24V, 48V) are increasingly widely used in recent vehicles due to increased performance of electric systems, and in this case, ultra-high voltage may be temporarily or continuously applied to the ECU 120.

The ECU 120 may be damaged due to the application of such an ultra-high voltage, and in this case, the EPS system 1 may not operate, thereby causing a great risk to vehicle stability.

Therefore, in order to protect the EPS system 1 of a vehicle using the high voltage, there is required to provide the protection device 200 of the ECU 120.

Figure 3:
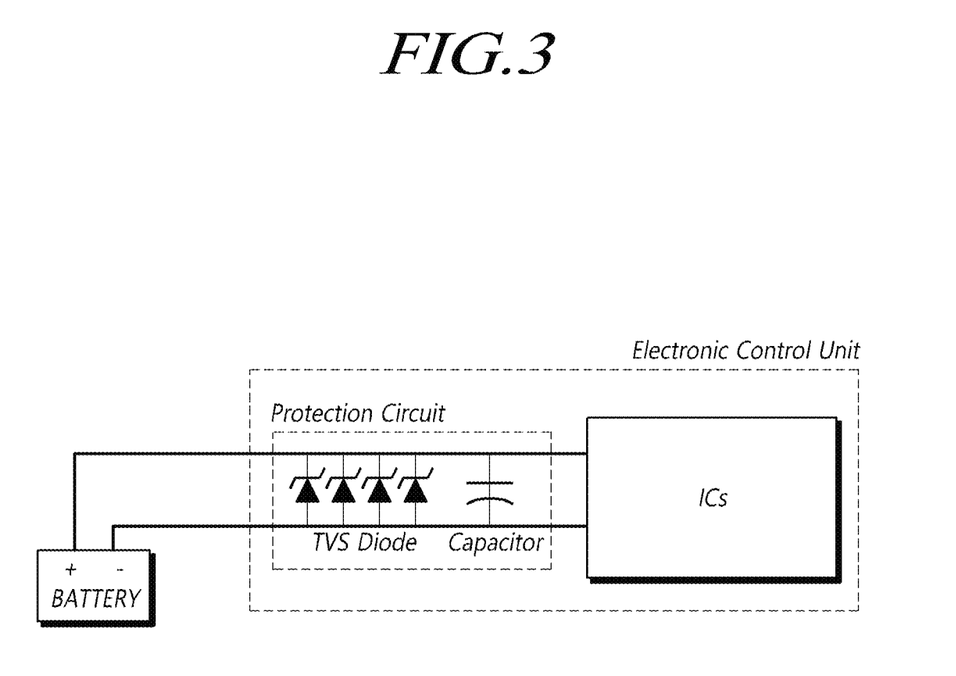
FIG. 3 illustrates an example of a configuration of a protection circuit in a general EPS system.

FIG. 3 illustrates an example of a configuration of a protection circuit in a general EPS system.

Referring to FIG. 3, a protection circuit of the ECU 120 of the general EPS system 1 may be disposed inside the ECU 120 to protect the ECU 120.

This general protection circuit of the ECU 120 may include a plurality of TVS diodes and capacitors disposed in parallel between the high voltage and the low voltage of the power supply (i.e., Battery).

The TVS diode may protect an IC of the ECU 120 at the rear end from unexpected overvoltage or surge caused by static electricity or power supply variation.

A rectifier diode or a Schottky barrier diode uses forward characteristics of a diode, but a TVS diode uses reverse characteristics like a Zener diode (ZD).

As shown in FIG. 3, the TVS diode is disposed between high voltage and low voltage, so that the TVS diode may be in an OFF state and consume only a specific leakage current if the circuit operates normally.

On the other hand, if an overvoltage such as a high voltage pulse or surge is applied, the TVS diode becomes ON state, and the overvoltage may be clamped by consuming the pulse current on the TVS side, so that the ECU 120 IC at the rear end may be protected.

Although the protection circuit of FIG. 3 is simple, in order to absorb high power, there is required to connect several TVS diodes in parallel or to use a capacitor with a very large capacity.

Therefore, there is a problem in that the cost and the size of the protection circuit are increased.

In addition, the ECU 120 may be properly protected if the abnormal high voltage is in the form of a pulse, but if the continuous high voltage is applied, the protection circuit may be damaged and the ECU 120 cannot be protected.

That is, if an abnormal high voltage is continuously applied, the clamping performance of the TVS diode may be exceeded, and as a result, the protection circuit may be damaged.

Alternatively, since there is required to increase the number of TVS diodes in order to respond to such a continuous high voltage, there may cause the cost and size problems of the protection circuit.

As described above, in a general ECU 120 protection circuit, as the power of the overvoltage pulse increases, additional devices may be required, and thus there may be difficult to respond to changes in the external environment.

Therefore, an embodiment of the present disclosure may propose a simple and reliable protection device for the EPS system 1 without the addition of elements.

Figure 4:
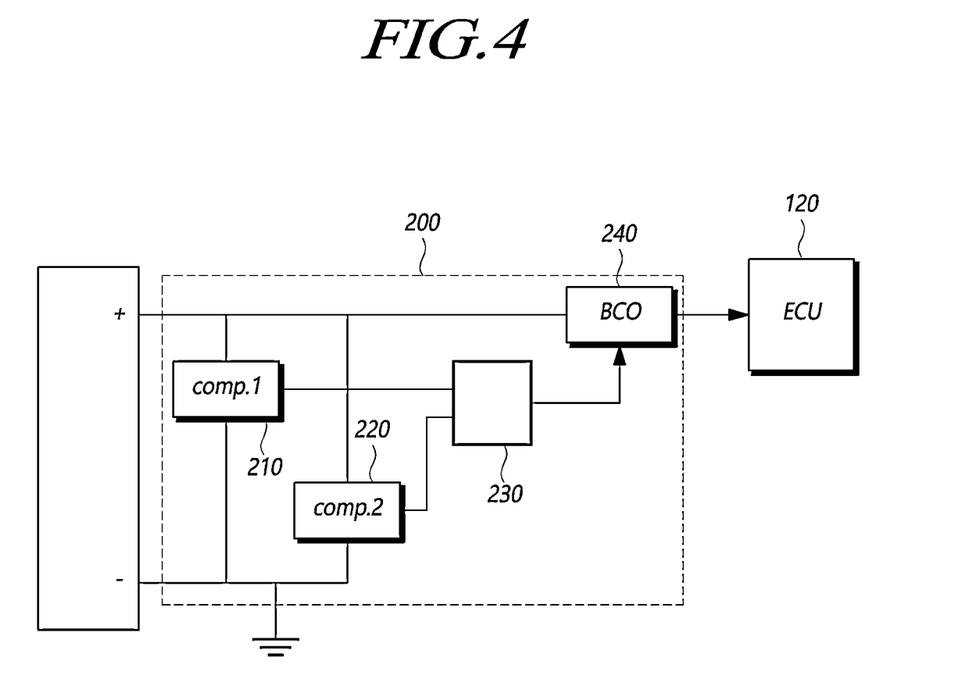
FIG. 4 is a functional block diagram of a protection device of an EPS system according to an embodiment of the present disclosure.

FIG. 4 is a functional block diagram of a protection device of an EPS system according to an embodiment of the present disclosure.

Referring to FIG. 4, a protection device 200 of the EPS system 1 according to an embodiment of the present disclosure may be configured to include a first comparator 210 and a second comparator 220 disposed between a high voltage potential and the low voltage potential (or ground) of the power supply 110, a battery cutoff device 240, and an exclusive switching unit 230 for switching the battery cutoff device.

Specifically, the first comparator 210 may compare the high voltage potential of the power supply 110 with a threshold high voltage $V_{th-H}$.

The first comparator 210 may output a first comparison output value of 0 or 1 according to a comparison result between the high voltage potential of the power supply 110 and the threshold high voltage $V_{th-H}$.

The second comparator 220 may compare the high voltage potential of the power supply 110 with a threshold low voltage $V_{th-L}$.

The second comparator 220 may output a second comparison output value of 0 or 1 according to a comparison result between the high voltage potential of the power supply 110 and the threshold low voltage $V_{th-L}$.

The first comparator 210 and the second comparator 220 may be implemented as voltage comparators, but are not limited thereto.

The exclusive switching unit 230 may output an enable signal EN or a disable signal DIAS according to whether a first comparison output signal of the first comparator 210 and a second comparison output signal of the second comparator 220 are the same.

The exclusive switching unit 230 may be an XOR gate element, but is not limited thereto, and may be an XNOR gate element depending on the characteristics of the battery cutoff device 240.

As an example, in the case that the exclusive switching unit 230 is an XOR gate element, the XOR gate element may output the disable signal DIAS if the first comparison output signal and the second comparison output signal are the same, and output the enable signal EN if the first comparison output signal and the second comparison output signal are different.

The battery cutoff device (BCO) 240 may switch the voltage supply of the power supply 110 to the ECU 120 according to an enable signal or a disable signal from the exclusive switching unit 230.

In this case, the threshold high voltage $V_{th-H}$ may be determined as a maximum voltage value that is greater than a driving voltage of the ECU 120 and does not cause damage to the ECU 120.

In addition, the threshold low voltage $V_{th-L}$ may be determined as a minimum voltage value that is smaller than the driving voltage of the ECU 120 and at which the ECU 120 can perform normal steering motor control.

In case of using the protection circuit 200 as described above, if the supply voltage of the power supply 110 is higher than the threshold high voltage $V_{th-H}$, the battery cutoff device 240 may be turned off and the power supply to the ECU 120 may be cut off.

In addition, even if the supply voltage of the power supply 110 is less than the threshold low voltage $V_{th-L}$, the battery cutoff device 240 may be turned off and the power supply to the ECU 120 may be cut off.

Figure 5:
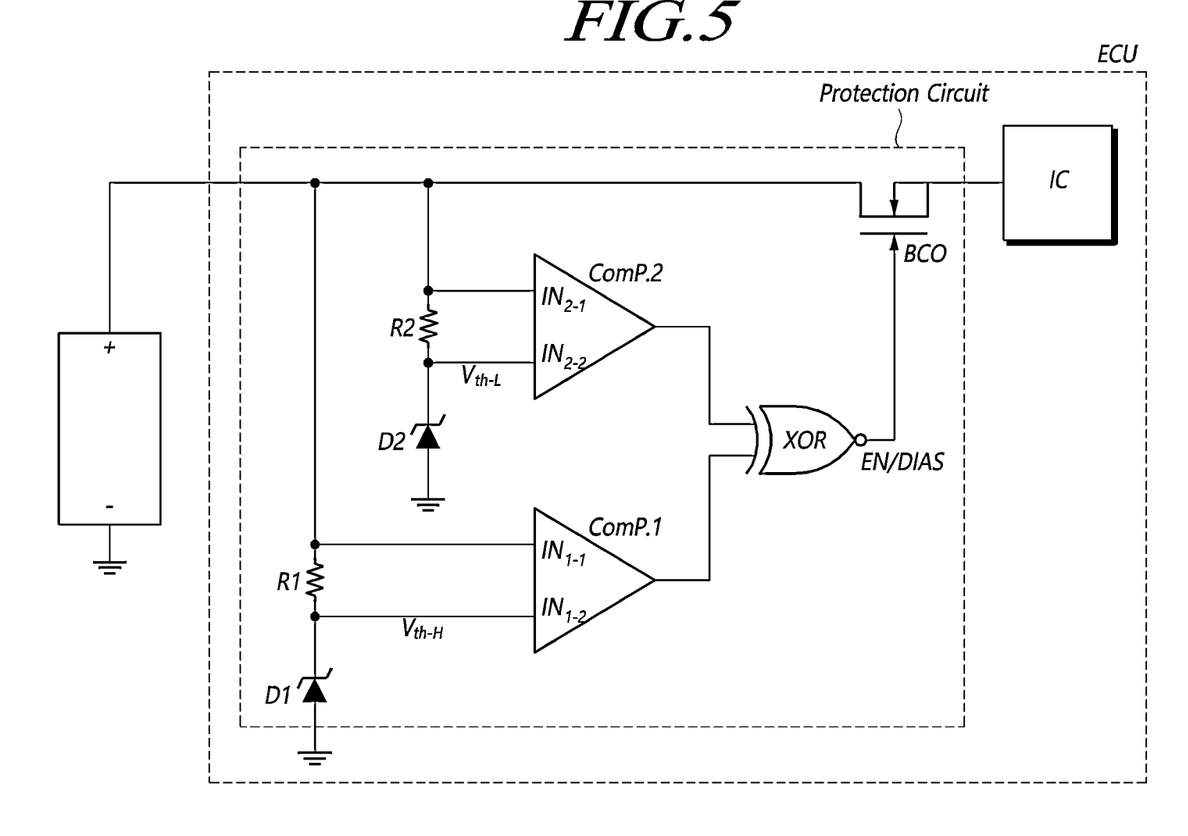
FIG. 5 illustrates an example of a circuit diagram of a protection device according to an embodiment of the present disclosure.

FIG. 5 illustrates an example of a circuit diagram of a protection device according to an embodiment of the present disclosure.

Referring to FIG. 5, the protection circuit as the protection device 200 of the EPS system 1 according to an embodiment may include a first comparator Comp. 1 as the first comparator 210 and a second comparator Comp. 2 as the second comparator 220 disposed between the high voltage potential and the low voltage potential (or ground) of the power supply 110.

In addition, the protection circuit may include an XOR gate element XOR as an exclusive switching unit to which the output signals of the first comparator 210 and the second comparator 220 are input.

The protection circuit may include a battery cutoff device (BCO) 240 which blocks power supply to an IC included in the ECU 120 according to an output signal of the XOR gate element XOR.

The first comparator Comp.1 may include two input terminals, a first-1 input terminal $IN_{1-1}$ connected to and receiving the high voltage potential of the power supply 110, and a first-2 input terminal $IN_{1-2}$ to which the threshold high voltage $V_{th-H}$ is input. Similarly, the second comparator Comp.2 may include two input terminals, a second-1 input terminal $IN_{2-1}$ connected to and receiving the high voltage potential of the power supply 110, and a second-2 input terminal $IN_{2-2}$ to which the threshold low voltage $V_{th-L}$ is input.

The first comparator Comp.1 may output a first comparison output signal having a value of 1 if the high voltage potential of the power supply 110 is greater than the threshold high voltage $V_{th-H}$, and output a second comparison output signal having a value of 0 if the high voltage potential of the power supply 110 is less than the threshold high voltage $V_{th-H}$.

The second comparator Comp.2 may output a first comparison output signal having a value of 1 if the high voltage potential of the power supply 110 is greater than the threshold low voltage $V_{th-L}$, and output a second comparison output signal having a value of 0 if the high voltage potential of the power supply 110 is less than the threshold low voltage $V_{th-L}$.

The XOR gate element XOR may output an enable signal EN or a disable signal DIAS depending on whether or not the first comparison output signal of the first comparator Comp. 1 and the second comparison output signal of the second comparator Comp. 2 are the same.

The XOR gate element may outputs the disable signal DIAS if the first comparison output signal and the second comparison output signal are the same, and output the enable signal EN if the first comparison output signal and the second comparison output t signal are different from each other.

The battery cutoff device (BCO) 240) may switch the voltage supply of the power supply 110 to the ECU 120 according to an enable signal or a disable signal from the exclusive switching unit 230.

As an example, the battery cutoff device 240 may be a field effect transistor (FET) including a gate receiving an enable signal, a source to which the voltage of the power supply 110 is applied, and a drain outputting an output voltage supplied to the electronic control unit 120.

Specifically, if an enable signal having a value of 1 is applied as a gate signal, the battery cutoff device BCO 240 may be turned on to supply the supply voltage of the power supply 110 to an IC of the ECU 120.

Meanwhile, if a disable signal having a value of 0 is applied as a gate signal, the battery cutoff device BCO 240 may be turned off to cut off power supply to the IC of the ECU 120.

Meanwhile, the protection circuit is shown to be included in the ECU in FIG. 5, however, is not limited thereto, and the protection circuit may be implemented as a separate device and interwork with the ECU.

It will be described an example of power supply control based on the protection circuit of FIG. 5 as follows.

In the case that a power supplied from the power supply 110 is a normal driving voltage between the threshold low voltage $V_{th-L}$ and the threshold high voltage $V_{th-H}$ (Case1), the operation is as follows.

Since the high voltage potential supplied from the power supply 110 is in a state between the threshold low voltage $V_{th-L}$ and the threshold high voltage $V_{th-H}$, the first comparator Comp. 1 outputs a value of 0, and the second comparator Comp.2 outputs a value of 1.

Accordingly, the XOR gate element XOR outputs an enable signal EN having a value of 1, and accordingly, the battery cutoff device BCO 240 may be turned on so that the supply voltage of the power supply 110 is normally supplied to the IC of the ECU 120.

If the power supplied from the power supply 110 is an abnormal high voltage greater than the threshold high voltage $V_{th-H}$ (Case 2), the operation is as follows.

Since the high voltage potential supplied from the power supply 110 is greater than the threshold low voltage $V_{th-L}$ and the threshold high voltage $V_{th-H}$, both the first comparator Comp.1 and the second comparator Comp.2 output values of 1.

Therefore, since the two input values are the same, the XOR gate element XOR outputs the disable signal DIAS having a value of 0, and accordingly, the battery cutoff device BCO 240 is turned off and the supply voltage of the power supply 110 is blocked from being applied to the IC of the ECU 120.

In the case that the power supplied from the power supply 110 is an abnormal low voltage smaller than the threshold low voltage $V_{th-L}$ (Case 3), the operation is as follows.

Since the high voltage potential supplied from the power supply 110 is smaller than the threshold low voltage $V_{th-L}$ and the threshold high voltage $V_{th-H}$, both the first comparator Comp.1 and the second comparator Comp.2 output a value of 0.

Accordingly, since the two input values are the same, the XOR gate element XOR outputs the disable signal DIAS having a value of 0, and accordingly, the battery cutoff device BCO 240 is turned off and the supply voltage of the power supply 110 is blocked from being applied to the IC of the ECU 120.

As described above, in the case of the protection circuit 200 as shown in FIG. 5, if the supply voltage of the power supply 110 is higher than the threshold high voltage $V_{th-H}$, the battery cutoff device 240 may be turned off and the power supply to the ECU 120 may be cut off.

In addition, even when the supply voltage of the power supply 110 is less than the threshold low voltage $V_{th-L}$, the battery cutoff device 240 may be turned off so that the power supply to the ECU 120 may be cut off.

That is, since the power supply to the ECU 120 is cut off when an abnormally high voltage is applied, there may prevent the damage to the ECU 120.

In addition, since the power supply to the ECU 120 is cut off even when an abnormally low voltage is applied, an abnormal operation of the ECU 120 due to the low voltage can be prevented in advance.

In addition, in the case that the power supply to the ECU 120 is cut off due to abnormal high voltage or low voltage, there may warn the driver in a visual, auditory, or the like manner, thereby further securing driving stability of the vehicle.

Meanwhile, as shown in FIG. 5, the protection circuit 200 as a protection device according to the present embodiment may further include a first resistance element R1 disposed between the first-1 input terminal $IN_{1-1}$ of the first comparator 210 to which the high voltage potential is input and the first-2 input terminal $IN_{1-2}$ to which the threshold high voltage is input, and a first diode element D1 disposed between the first-2 input terminals $IN_{1-2}$ and the ground.

Similarly, the protection circuit 200 may further include a second resistance element R2 disposed between the second-1 input terminal $IN_{2-1}$ of the second comparator 220 to which the high voltage potential is input and the second-2 input terminal $IN_{2-2}$ to which the threshold low voltage is input, and a second diode element D2 disposed between the second-2 input terminals $IN_{2-2}$ and the ground.

In this case, the threshold high voltage $V_{th-H}$ may be determined based on a magnitude of a resistance value of the first resistance element R1, and the threshold low voltage $V_{th-L}$ may be determined based on a magnitude of a resistance value of the second resistance element R2.

The resistance value of the first resistance element R1 may be smaller than that of the second resistance element R2.

The first diode element D1 and the second diode element D2 may be Zener diodes.

In the embodiments of FIGS. 4 and 5, the exclusive switching unit 230 is illustrated as being an XOR gate element, but is not limited thereto.

For example, if the battery cutoff device (BCO) 240 has a characteristic of being turned on when a low-level signal is input to a gate, the exclusive switching unit 230 may be an XNOR gate element.

In this case, if an abnormally high voltage is applied, both the first comparator Comp.1 and the second comparator Comp.2 output the value of 1. Accordingly, since the two input values are the same, the XNOR gate element XNOR may output the disable signal DIAS having a value of 1, and accordingly, the battery cutoff device (BCO) may be turned off, thereby blocking power supply of the power supply 110 to the IC of the ECU 120.

That is, in the case that the exclusive switching unit 230 is an XNOR gate element, the enable signal EN may have a value of 0 and the disable signal DIAS may have a value of 1.

Meanwhile, the EPS system 1 may be protected even if the high voltage applied to the EPS system 1 is not in the form of a pulse, which will be described in more detail below with reference to FIG. 8.

Figure 6:
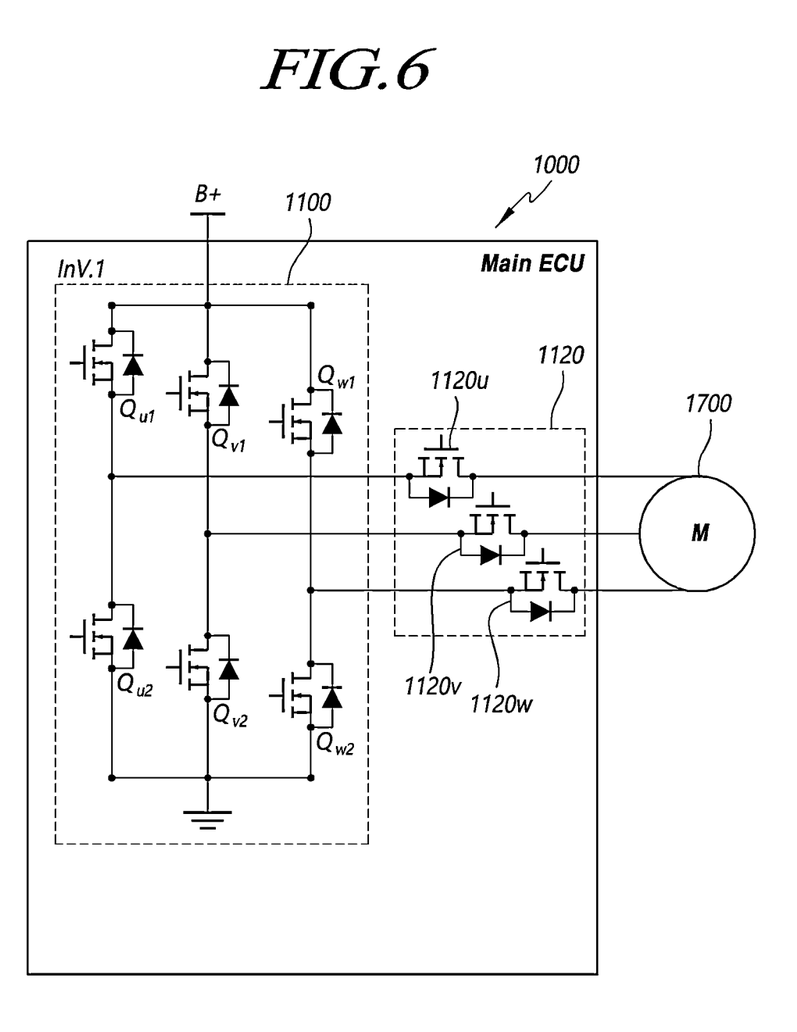
FIG. 6 illustrates an example of a detailed configuration of an ECU in an EPS system according to an embodiment of the present disclosure.

FIG. 6 illustrates an example of a detailed configuration of an ECU in an EPS system according to an embodiment of the present disclosure.

An ECU 1000 included in the EPS system according to the present embodiment may include an inverter 1100 and a switching unit 1120 disposed between the inverter and an EPS steering motor 1700. The switching unit 1120 may include three first switches 1120u, 1120v, and 1120w to switch each of the three-phase control currents provided by the inverter to the steering motor 1700.

In addition, the ECU 1000 may further include a power switch (not shown) for controlling the power supply from a power source such as a battery to the inverter 1100 or a separate control unit or micro control unit (MCU) for controlling the switching unit 1120.

The inverter 1100 may convert the direct current (DC) supply voltage of the battery to alternating current (AC) voltage, or apply the alternating current voltage (or alternating current) to the steering motor 1700. Specifically, the inverter 1100 may convert the supply voltage of the battery into AC and apply the AC voltage/current to each phase of the steering motor 1700.

Specifically, the inverter 1100 may be implemented as a bridge circuit including 6 switches disposed on both ends of a power source. That is, the inverter 110 may have a H-bridge structure in which an upper u current FET Qu1, a lower u current FET Qu2, an upper v current FET Qv1, a lower v current FET Qv2, an upper w current FET Qw1 and a lower w current FET Qw2 disposed are connected in parallel between the high voltage power supply side (+B) and the ground.

A line between the upper u current FET Qu1 and lower u current FET Qu2 may be connected to an u phase first switch 1120u of the switching unit 1120, and the lines of the remaining FETs for the v and w phases may be connected to the v and w phase first switches 1120v and 1120w of the switching unit 1120, respectively.

The ECU 1000 may control the switch On/Off of the inverter 1100 according to the steering torque detected by the torque sensor or the target torque value transmitted from the domain control unit, thereby applying the target steering control current to the EPS steering motor 1700.

Figure 7:
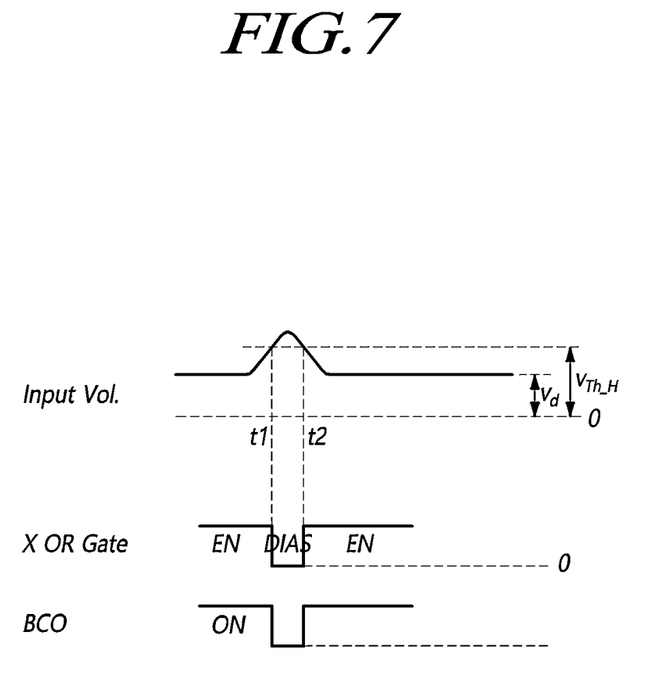
FIG. 7 illustrates an example of a signal waveform in each element of a protection device if a temporary overvoltage pulse is applied to an ECU of an EPS system according to an embodiment of the present disclosure.
Figure 8:
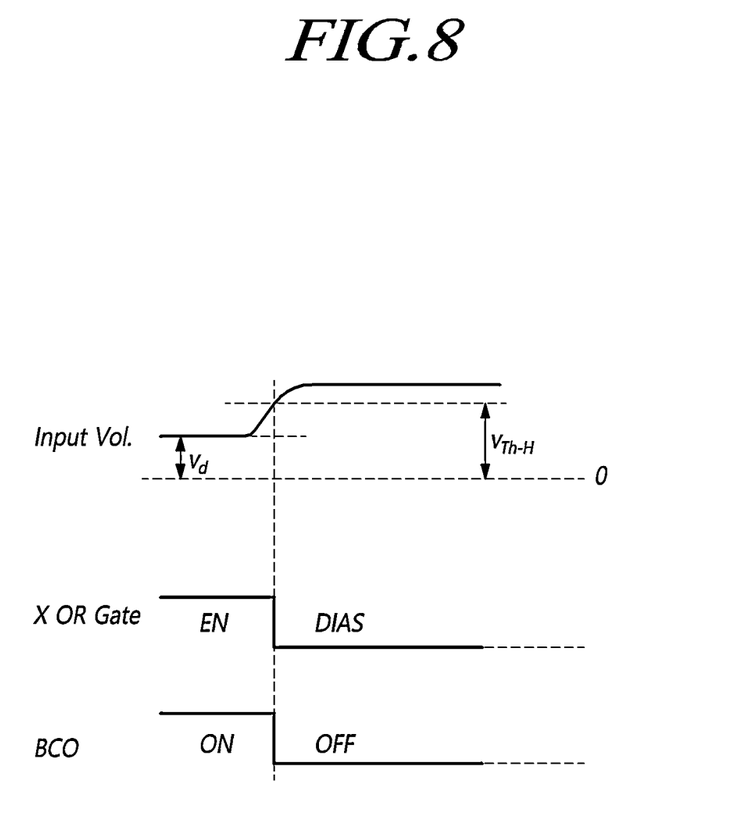
FIG. 8 illustrates an example of a signal waveform in each element of a protection device if a continuous overvoltage is applied to an ECU of an EPS system according to an embodiment of the present disclosure.
Figure 9:
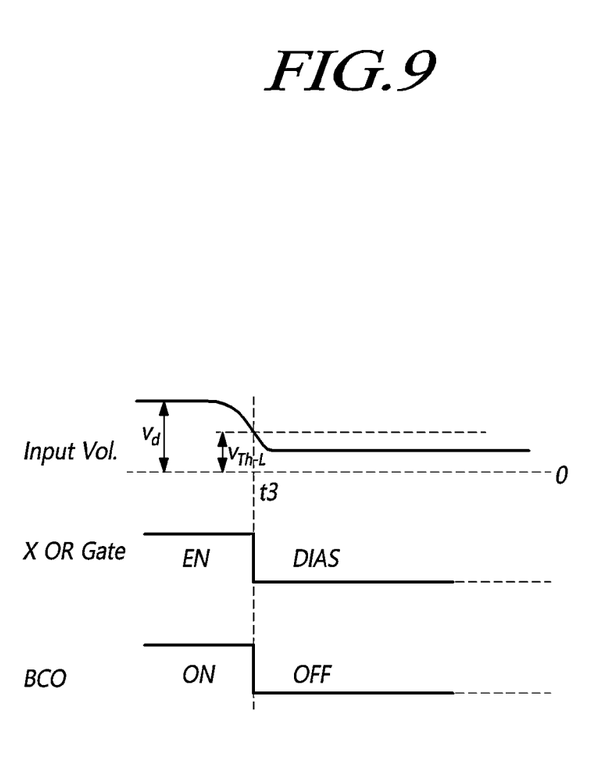
FIG. 9 illustrates an example of a signal waveform in each element of the protection device if a low voltage is applied to the ECU of the EPS system according to an embodiment of the present disclosure.

FIGS. 7 to 9 illustrate examples of signal waveforms in each element of the protection device according to the type of abnormal power applied to the ECU of the EPS system.

FIG. 7 illustrates an example of a signal waveform in each element of a protection device if a temporary overvoltage pulse is applied to an ECU of an EPS system according to an embodiment of the present disclosure.

FIG. 7 may correspond to a case in which a temporary overvoltage pulse is generated in a state of applying a normal driving voltage Vd from the power supply.

According to the protection circuit of FIG. 5, while the normal driving voltage Vd is supplied (t<t1), the driving voltage Vd is between the threshold low voltage $V_{th-L}$ and the threshold high voltage $V_{th-H}$, so that the first comparator Comp.1 outputs a value of 0 and the second comparator Comp.2 outputs a value of 1.

Accordingly, the XOR gate element XOR may output an enable signal EN having a value of 1, and accordingly, the battery cutoff device (BCO) may be turned on, so that the supply voltage of the power supply may be normally supplied to the IC of the ECU 1000.

If an abnormal power pulse is temporarily generated and the voltage reaches the threshold high voltage $V_{th-H}$ at a time point t1, the first comparison output value of the first comparator Comp. 1 may be switched from 0 to 1, and the second comparator Comp.2 may continuously output a value of 1.

Therefore, since the two input values are the same, the XOR gate element XOR outputs the disable signal DIAS having a value of 0, and accordingly, the battery cutoff device BCO may be turned off, so that the supply voltage of the power supply is blocked from being applied to the IC of the ECU 1000.

Thereafter, if the supply voltage returns to a normal state, the first comparison output value of the first comparator Comp.1 may change from 1 to 0 at a time point t2 when the voltage becomes less than the threshold high voltage $V_{th-H}$, and the second comparator Comp. 2 may continuously output a value of 1.

Accordingly, the XOR gate element XOR may output an enable signal EN having a value of 1, and accordingly, the battery cutoff device BCO may be turned on so as to resume power supply to the ECU 1000.

As above, in the case that a temporary overvoltage pulse is generated while the normal driving voltage Vd is applied, power supply to the ECU 1000 may be cut off only during the period for which the overvoltage occurs.

As a result, power supply to the ECU 1000 may be continued while protecting the ECU 1000 against a temporary overvoltage pulse.

FIG. 8 illustrates an example of a signal waveform in each element of a protection device if a continuous overvoltage is applied to an ECU of an EPS system according to an embodiment of the present disclosure.

As in FIG. 7, while the normal driving voltage Vd is supplied (t<t1), the battery cutoff device BCO is turned on to normally supply the supply voltage of the power supply to the IC of the ECU 1000.

In this state, if continuous abnormal power is input, the first comparison output value of the first comparator Comp.1 may change from 0 to 1 at the time point t1 when the voltage reaches the threshold high voltage $V_{th-H}$, and the second comparator Comp. 2 may continuously output a value of 1.

Therefore, since the two input values are the same, the XOR gate element XOR outputs the disable signal DIAS having a value of 0, and accordingly, the battery cutoff device BCO may be turned off so that the supply voltage of the power supply may be blocked from being applied to the IC of the ECU 1000.

Since the potential of the supply voltage continues to be higher than the threshold high voltage $V_{th-H}$, the blocking of the power supply to the ECU 1000 is maintained.

Accordingly, unlike the protection device shown in FIG. 3, according to the present embodiment, even when continuous overvoltage is input, it is possible to effectively perform the ECU protection function without increasing the capacity of the protection circuit or changing the element.

FIG. 9 illustrates an example of a signal waveform in each element of the protection device if a low voltage is applied to the ECU of the EPS system according to an embodiment of the present disclosure.

The low voltage in this specification may mean a low voltage at a level difficult for the ECU 1000 to normally operate.

That is, FIG. 9 illustrates a case in which a normal driving voltage Vd is applied and then the voltage drops to an abnormally low voltage at a specific time point of t3.

As in FIG. 7, while the normal driving voltage Vd is supplied (t<t1), the battery cutoff device BCO is turned on to normally supply the supply voltage of the power supply to the IC of the ECU 1000.

In this state, if the continuous abnormal low voltage power is input, the second comparison output value of the second comparator Comp.2 1 is converted from 1 to 0 at the time point t3 when the voltage reaches the threshold low voltage $V_{th-L}$, and the first comparator Comp. 1 may continuously output a first comparison output value of 0.

Therefore, since the two input values are the same, the XOR gate element XOR outputs the disable signal DIAS having a value of 0, and accordingly, the battery cutoff device BCO may be turned off so that the supply voltage of the power supply is blocked from being applied to the IC of the ECU 1000.

Even after that, since the potential of the supply voltage continues to be below the threshold low voltage $V_{th-L}$, the blocking of the power supply to the ECU 1000 may be maintained.

According to the present embodiment, unlike the protection device shown in FIG. 3, the power supply to the ECU 1000 may be cut off even if an abnormal low voltage is applied, thereby preventing abnormal operation of the ECU 1000 due to low voltage in advance.

As described above, according to embodiments of the present disclosure, it is possible to provide a simple and stable protection device capable of protecting the EPS system of a vehicle from high voltage.

In addition, according to the present embodiments, the EPS system can be effectively protected even if the high voltage applied to the EPS system has a continuous waveform rather than a pulse form.

In addition, operation failure of the EPS system due to low voltage may be prevented by preventing the battery cutoff device from supplying voltage even at abnormally high voltage as well as abnormally low voltage.

In addition, according to the present embodiments, it is possible to provide an effect of effectively protecting the ECU without adding a device or changing a circuit even if the magnitude of the power of the overvoltage pulse is changed.

It should be noted that although all or some of the configurations or elements included in one or more of the embodiments described above have been combined to constitute a single configuration or component or operated in combination, the present disclosure is not necessarily limited thereto. That is, within the scope of the object or spirit of the present disclosure, all or some of the configurations or elements included in the one or more of the embodiments may be combined to constitute one or more configurations or components or operated in such combined configuration (s) or component (s). Further, each of the configurations or elements included in one or more of the embodiments may be implemented by an independent hardware configuration; however, some or all of the configurations or elements may be selectively combined and implemented by one or more computer program(s) having one or more program module (s) that perform some or all functions from one or more combined hardware configuration(s). Codes or code segments constituting the computer program(s) may be easily produced by those skilled in the art. As the computer programs stored in computer-readable media are read and executed by a computer, embodiments of the present disclosure can be implemented. The media for storing computer programs may include, for example, a magnetic storing medium, an optical recording medium, and a carrier wave medium.

Further, unless otherwise specified herein, terms 'include', 'comprise', 'constitute', 'have', and the like described herein mean that one or more other configurations or elements may be further included in a corresponding configuration or element. Unless otherwise defined herein, all the terms used herein including technical and scientific terms have the same meaning as those understood by those skilled in the art. The terms generally used such as those defined in dictionaries should be construed as being the same as the meanings in the context of the related art and should not be construed as being ideal or excessively formal meanings, unless otherwise defined herein.

The above description has been presented to enable any person skilled in the art to make and use the technical idea of the present disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the present disclosure. The above description and the accompanying drawings provide an example of the technical idea of the present disclosure for illustrative purposes only. That is, the disclosed embodiments are intended to illustrate the scope of the technical idea of the present disclosure. Thus, the scope of the present disclosure is not limited to the embodiments shown, but is to be accorded the widest scope consistent with the claims. The scope of protection of the present disclosure should be construed based on the following claims, and all technical ideas within the scope of equivalents thereof should be construed as being included within the scope of the present disclosure.

What is claimed is:

1. An electric power steering system comprising:
a power supply;
an electronic control unit configured to control driving of a steering motor based on a supply voltage applied from the power supply;
a steering motor which is driven by the electronic control unit to electrically assist or operate a steering of a vehicle; and
a protection device including a protection circuit configured to prevent an abnormal voltage from being applied to the electronic control unit,
wherein the protection circuit comprises,
a first comparator for comparing a high voltage potential of the power supply with a threshold high voltage;
a second comparator for comparing the high voltage potential of the power supply with a threshold low voltage;
an exclusive switching unit configured to output an enable signal or a disable signal according to whether a first comparison output signal of the first comparator and a second comparison output signal of the second comparator are the same; and
a battery cutoff device configured to switch a voltage supply of the power supply to the electronic control unit according to the enable signal or the disable signal.

2. The electric power steering system of claim 1, wherein the exclusive switching unit is an XOR gate element.

3. The electric power steering system of claim 2, wherein the XOR gate element outputs the disable signal in response to determining that the first comparison output signal and the second comparison output signal are the same, and outputs the enable signal in response to determining that the first comparison output signal and the second comparison output signal are different.

4. The electric power steering system of claim 1, wherein the battery cutoff device includes a gate receiving the enable signal, a source receiving a voltage of the power supply, and a field effect transistor (FET) including a drain that outputs an output voltage supplied to the electronic control unit.

5. The electric power steering system of claim 1, wherein the protection circuit further comprises a first resistance element disposed between a first-1 input terminal of the first comparator for inputting the high voltage potential and a first-2 input terminal to which the threshold high voltage is input, and a first diode element disposed between the first-2 input terminal and a ground.

6. The electric power steering system of claim 5, wherein the protection circuit further comprises a second resistance element disposed between a second-1 input terminal of the second comparator for inputting the high voltage potential and a second-2 input terminal to which the threshold low voltage is input, and a second diode element disposed between the second-2 input terminal and the ground.

7. The electric power steering system of claim 6, wherein a value of the threshold high voltage is determined by the first resistance element, and a value of the threshold low voltage is determined by the second resistance element.

8. The electric power steering system of claim 1, wherein, in response to determining that the supply voltage of the power supply is equal to or higher than the threshold high voltage, the battery cutoff device is turned off and power supply to the electronic control unit is cut off.

9. The electric power steering system of claim 1, wherein, in response to determining that the supply voltage of the power supply is less than or equal to the threshold low voltage, the battery cutoff device is turned off and power supply to the electronic control unit is cut off.

10. The electric power steering system of claim 7, wherein a resistance value of the first resistance element is smaller than a resistance value of the second resistance element.

11. A protection device for an electric power steering system comprising:
a first comparator configured to compare a high voltage potential of a power supply of an electric power steering system with a threshold high voltage;
a second comparator configured to compare the high voltage potential of the power supply with a threshold low voltage;
an exclusive switching unit configured to output an enable signal or a disable signal according to whether a first comparison output signal of the first comparator and a second comparison output signal of the second comparator are the same; and
a battery cutoff device configured to switch a voltage supply of the power supply to an electronic control unit of the electric power steering system according to the enable signal or the disable signal.

12. The protection device of claim 11, wherein the exclusive switching unit is an XOR gate element.

13. The protection device of claim 12, wherein the XOR gate element outputs the disable signal in response to determining that the first comparison output signal and the second comparison output signal are the same, and outputs the enable signal in response to determining that the first comparison output signal and the second comparison output signal are different.

14. The protection device of claim 11, wherein the battery cutoff device includes a gate receiving the enable signal, a source receiving a voltage of the power supply, and a field effect transistor (FET) including a drain that outputs an output voltage supplied to the electronic control unit.

15. The protection device of claim 11, further comprising:
a first resistance element disposed between a first-1 input terminal of the first comparator for inputting the high voltage potential and a first-2 input terminal to which the threshold high voltage is input; and
a first diode element disposed between the first-2 input terminal and a ground.

16. The protection device of claim 15, further comprising:
a second resistance element disposed between a second-1 input terminal of the second comparator for inputting the high voltage potential and a second-2 input terminal to which the threshold low voltage is input; and
a second diode element disposed between the second-2 input terminal and the ground.

17. The protection device of claim 16, wherein a value of the threshold high voltage is determined by the first resistance element, and a value of the threshold low voltage is determined by the second resistance element.

18. The protection device of claim 11, wherein, in response to determining that the supply voltage of the power supply is equal to or higher than the threshold high voltage, the battery cutoff device is turned off and power supply to the electronic control unit is cut off.

19. The protection device of claim 11, wherein, in response to determining that the supply voltage of the power supply is less than or equal to the threshold low voltage, the battery cutoff device is turned off and power supply to the electronic control unit is cut off.

20. The protection device of claim 17, wherein a resistance value of the first resistance element is smaller than a resistance value of the second resistance element.

* * * * *